United States Patent
Uemura et al.

(10) Patent No.: US 12,249,928 B2
(45) Date of Patent: Mar. 11, 2025

(54) POWER CONVERTER, MOTOR DRIVER, AND REFRIGERATION CYCLE APPLIED EQUIPMENT

(71) Applicant: Mitsubishi Electric Corporation, Tokyo (JP)

(72) Inventors: Keisuke Uemura, Tokyo (JP); Tomohiro Kutsuki, Tokyo (JP); Haruka Matsuo, Tokyo (JP); Koichi Arisawa, Tokyo (JP); Takaaki Takahara, Tokyo (JP); Kenji Takahashi, Tokyo (JP); Koyo Matsuzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 18/251,039

(22) PCT Filed: Jan. 6, 2021

(86) PCT No.: PCT/JP2021/000192
§ 371 (c)(1),
(2) Date: Apr. 28, 2023

(87) PCT Pub. No.: WO2022/149206
PCT Pub. Date: Jul. 14, 2022

(65) Prior Publication Data
US 2023/0412093 A1    Dec. 21, 2023

(51) Int. Cl.
*H02M 7/5387* (2007.01)
*H02M 1/00* (2007.01)
(Continued)

(52) U.S. Cl.
CPC ..... *H02M 7/53873* (2013.01); *H02M 1/0025* (2021.05); *H02M 1/007* (2021.05);
(Continued)

(58) Field of Classification Search
CPC .. H02M 1/007; H02M 1/0009; H02M 1/0025; H02M 1/143; H02M 1/4225; H02M 7/53873
See application file for complete search history.

(56) References Cited

U.S. PATENT DOCUMENTS 5,663,627 A * 9/1997 Ogawa ............... F24F 11/86
                                                   318/803
7,471,525 B2   12/2008 Suzuki et al.
(Continued)

FOREIGN PATENT DOCUMENTS

EP     1978628 A2    10/2008
JP     H09-037559 A   2/1997
(Continued)

OTHER PUBLICATIONS

International Search Report of the International Searching Authority mailed Feb. 22, 2021 in corresponding International Application No. PCT/JP2021/000192 (and English translation).

*Primary Examiner* — Jue Zhang
(74) *Attorney, Agent, or Firm* — Posz Law Group, PLC (57) ABSTRACT

A power converter includes a converter, a smoothing capacitor, an inverter, and a single calculator. The converter includes a switching element and rectifies a power supply voltage applied from an alternating-current power supply. The smoothing capacitor smooths a rectified voltage output from the converter into a direct-current voltage including a ripple. The inverter converts the direct-current voltage smoothed by the smoothing capacitor into an alternating-current voltage for a motor. The calculator performs control such that a first physical quantity representing an operation state of the converter is equal to a second physical quantity representing an operation state of the inverter.

9 Claims, 10 Drawing Sheets

(51) Int. Cl.
*H02M 1/14* (2006.01)
*H02M 1/42* (2007.01)

(52) U.S. Cl.
CPC .......... *H02M 1/143* (2013.01); *H02M 1/0009* (2021.05); *H02M 1/4225* (2013.01)

(56) References Cited

U.S. PATENT DOCUMENTS

| | | | |
|---|---|---|---|
| 7,839,663 | B2 | 11/2010 | Suzuki et al. |
| 2006/0138973 | A1* | 6/2006 | Hirosawa .......... H02M 3/33576 363/21.01 |
| 2016/0094180 | A1* | 3/2016 | Ajima .................... B62D 5/065 318/504 |

FOREIGN PATENT DOCUMENTS

| | | |
|---|---|---|
| JP | 2006-067754 A | 3/2006 |
| JP | 2008-259343 A | 10/2008 |

* cited by examiner

POWER CONVERTER, MOTOR DRIVER, AND REFRIGERATION CYCLE APPLIED EQUIPMENT

CROSS REFERENCE TO RELATED APPLICATION

This application is a U.S. national stage application of PCT/JP2021/000192 filed on Jan. 6, 2021, the contents of which are incorporated herein by reference.

The present disclosure relates to a power converter that converts alternating-current power into desired power and also relates to a motor driver and a refrigeration cycle applied equipment.

BACKGROUND

A power converter includes: a converter that rectifies a power supply voltage that is a voltage of an alternating-current power supply; a smoothing capacitor that smooths a rectified voltage output from the converter; and an inverter that converts a direct-current voltage output via the smoothing capacitor into an alternating-current voltage for a load. In other words, the power converter has, between the converter and the inverter, the smoothing capacitor that smooths the voltage output from the converter.

In this type of power converter, power is supplied from the smoothing capacitor to the inverter during a period when the rectified voltage output from the converter is lower than a capacitor voltage that refers to the voltage of the smoothing capacitor. Therefore, a discharge current flows through the smoothing capacitor. During a period when the rectified voltage is higher than the capacitor voltage, the power is supplied from the alternating-current power supply to the inverter. This is when a charge current flows through the smoothing capacitor. In this way, the power converter continuously supplies the power from the inverter to the load.

Smoothing capacitors are generally known to be components having a limited life-span. A capacitor current that refers to the current flowing through the smoothing capacitor is one factor determining the life of the smoothing capacitor. Therefore, if the capacitor current can be reduced, the smoothing capacitor is enabled to have a longer life. However, in order to reduce the capacitor current it is necessary to increase the capacitance of the smoothing capacitor. If the capacitance of the smoothing capacitor increases, higher costs of the smoothing capacitor becomes problematic.

Given such a technical background, Patent Literature 1 cited below describes: a converter circuit that converts alternating-current power into direct-current power; a smoothing capacitor connected in parallel with a direct-current side of the converter circuit; and a power converter that controls a capacitor current flowing through the smoothing capacitor to a set value. In this power converter, a reduced capacitance of the smoothing capacitor is achieved by detecting the capacitor current flowing through the smoothing capacitor and controlling the detected capacitor current to the set value.

PATENT LITERATURE

Patent Literature 1: Japanese Patent Application Laid-open No. 2006-67754

However, the technique described in Patent Literature 1 is a technique that causes the capacitor current to follow the set value, namely a command value. When the capacitor current is caused to follow the command value, a target value is fixed to zero. In this case, an integral (I) controller is required for a controller to follow and converge to the target value, which is the fixed value. However, in the cases of the capacitor current cannot be made zero due to a load or an environment during operation, output of the I controller increases to become saturated, and the control accuracy may become degraded.

Moreover, the technique described in Patent Literature 1 does not take into consideration timing of acquisition of detection values of converter current and inverter current. In the power converter, asynchronous detections of the converter current and the inverter current are generally adopted. However, the asynchronous detections of the converter current and the inverter current cause a time lag in actual circuital operation even if a control system controls the capacitor current to zero. Therefore, the capacitor current cannot be said to be controlled to zero when viewed instantaneously. Even when viewed from this perspective, the control accuracy may degrade.

SUMMARY

The present disclosure has been made in view of the above, and an object of the present disclosure is to obtain a power converter that avoids degradation of control accuracy while enabling reduced capacitance of a smoothing capacitor.

In order to solve the above-stated problems and achieve the object, a power converter according to the present disclosure includes: a converter; a smoothing capacitor; an inverter, and a single calculator. The converter includes at least one first semiconductor switching element and is adapted to rectify a power supply voltage applied from an alternating-current power supply. The smoothing capacitor is adapted to smooth a rectified voltage output from the converter into a direct-current voltage including a ripple. The inverter is adapted to convert the direct-current voltage smoothed by the smoothing capacitor into an alternating-current voltage to be applied to a motor. The single calculator is adapted to perform control such that a first physical quantity representing an operation state of the converter is equal to a second physical quantity representing an operation state of the inverter.

The power converter according to the present disclosure has effects of avoiding degradation of control accuracy and enabling reduced capacitance of the smoothing capacitor.

DETAILED DESCRIPTION

With reference to the accompanying drawings, a detailed description is hereinafter provided of power converters, a motor driver, and a refrigeration cycle applied equipment according to embodiments of the present disclosure.

First Embodiment

Figure 1:
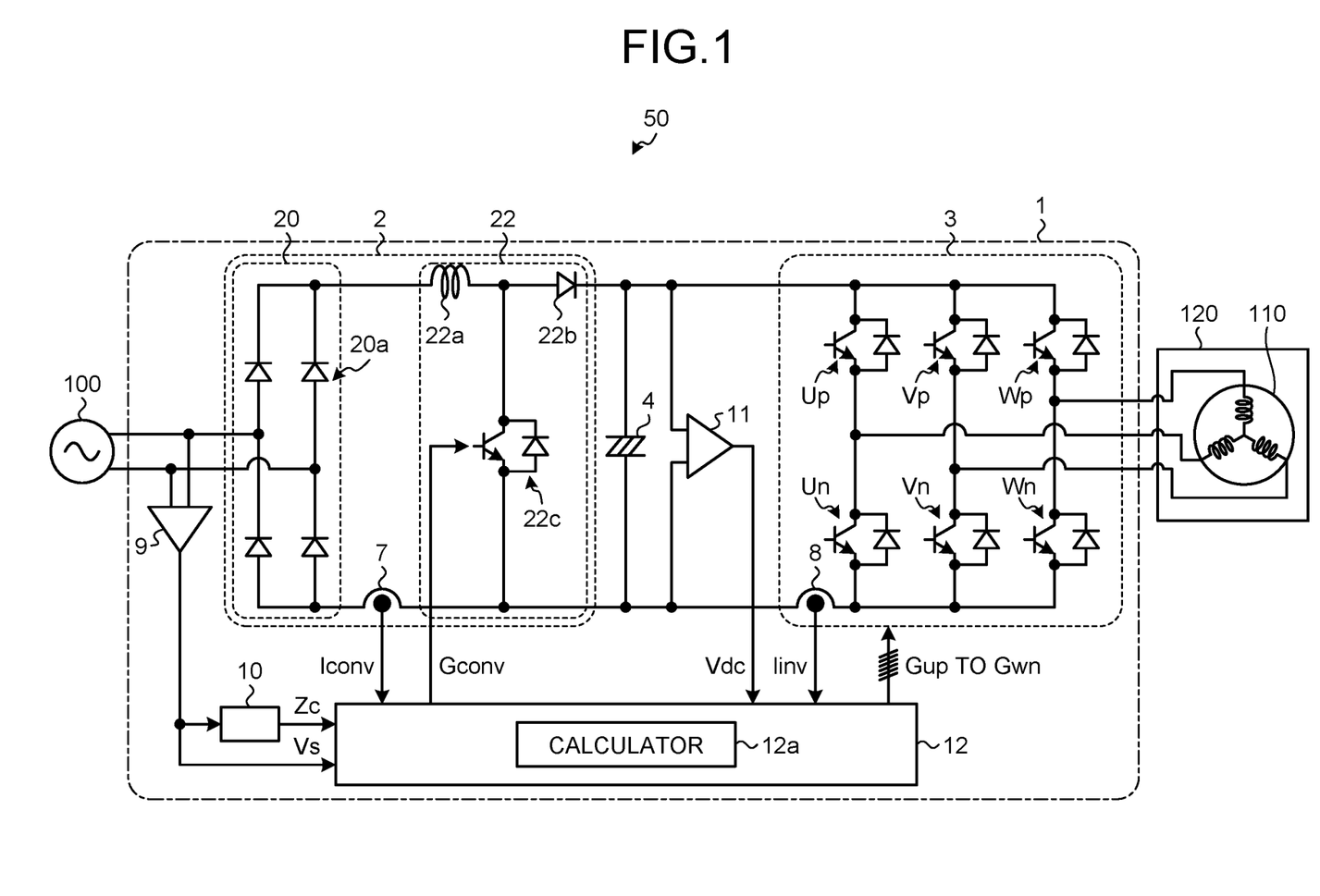
FIG. 1 is a diagram illustrating a configuration example of a power converter according to a first embodiment.

FIG. 1 is a diagram illustrating a configuration example of a power converter 1 according to a first embodiment. The power converter 1 is connected to an alternating-current power supply 100 and a compressor 120. The compressor 120 is an example of a load having periodic load torque variations. The compressor 120 includes a motor 110. The power converter 1 converts a power supply voltage applied from the alternating-current power supply 100 into an alternating-current voltage having a desired amplitude and a desired phase and applies the alternating-current voltage to the motor 110.

The power converter 1 includes: a converter 2; an inverter 3; a smoothing capacitor 4; a controller 12; voltage detectors 9 and 11; and a zero crossing detector 10. The power converter 1 and the motor 110 included in the compressor 120 constitute a motor driver 50.

The voltage detector 9 detects the power supply voltage Vs applied to the converter 2 from the alternating-current power supply 100. The zero crossing detector 10 generates a zero crossing signal Zc in accordance with the power supply voltage Vs of the alternating-current power supply 100. The zero crossing signal Zc is, for example, a signal that outputs a "High" level when the power supply voltage Vs is of positive polarity and outputs a "Low" level when the power supply voltage Vs is of negative polarity. These levels may be reversed. A detection value of the power supply voltage Vs and the zero crossing signal Zc are input to the controller 12.

The converter 2 includes a rectifier 20 and a booster 22. The rectifier 20 includes four rectifier elements 20a connected in a bridge configuration. The rectifier 20 rectifies the power supply voltage Vs applied from the alternating-current power supply 100. The booster 22 is connected to output terminals of the rectifier 20. The booster 22 boosts a rectified voltage output from the rectifier 20 and applies the boosted voltage to the smoothing capacitor 4. In the example of FIG. 1, the alternating-current power supply 100 is a single-phase power supply. In the cases where the alternating-current power supply 100 is a three-phase power supply, six rectifier elements 20a are used. In the cases of the alternating-current power supply 100 is the three-phase power supply, how the rectifier elements 20a are arranged and connected is publicly known and is not described here.

The booster 22 includes a reactor 22a, a rectifier element 22b, and a semiconductor switching element 22c. In the booster 22, the semiconductor switching element 22c turns on or off under control of a drive signal Gconv that is output from the controller 12. When the semiconductor switching element 22c is controlled to be turn-on, the rectified voltage is short-circuited via the reactor 22a. This operation is referred to as "power supply short-circuiting operation". When the semiconductor switching element 22c is controlled to be turn-off, the rectified voltage is applied to the smoothing capacitor 4 via the reactor 22a and the rectifier element 22b. This operation refers to normal rectification operation. If the reactor 22a has stored energy at this time, the rectified voltage and a voltage generated across the reactor 22a add up and are applied to the smoothing capacitor 4.

The booster 22 boosts the rectified voltage by alternately repeating the power supply short-circuiting operation and the rectification operation. These operations are referred to as "boost operation". The boost operation boosts a voltage between both ends of the smoothing capacitor 4 to a voltage higher than the power supply voltage Vs. Moreover, the boost operation improves a power factor of a power supply current that is a current flowing between the alternating-current power supply 100 and the converter 2. In other words, boost control that causes the booster 22 to perform the boost operation is performed in the first embodiment to boost the rectified voltage and improve the power factor of the power supply current. This control enables a waveform of the power supply current to approximate a sine wave.

The smoothing capacitor 4 is connected between output terminals of the converter 2. The smoothing capacitor 4 smooths the rectified voltage output from the converter 2 into a direct-current voltage including a ripple. Examples of the smoothing capacitor 4 include an electrolytic capacitor and a film capacitor, among others.

The voltage that is generated across the smoothing capacitor 4 has, rather than a full-wave rectified waveform of the alternating-current power supply 100, a waveform including a direct-current component with voltage ripple based on a frequency of the alternating-current power supply 100 superimposed but does not pulsate significantly. A main frequency component of this voltage ripple is a component that is double the frequency of the power supply voltage Vs when the alternating-current power supply 100 is the single-phase power supply or six times the frequency of the power supply voltage Vs when the alternating-current power supply 100 is the three-phase power supply. If the power input from the alternating-current power supply 100 and the power that is output from the inverter 3 do not change, amplitude of this voltage ripple is determined by capacitance of the smoothing capacitor 4. However, as stated above, the power converter according to the present disclosure avoids increased capacitance for a restrained increase in costs of the smoothing capacitor 4. Therefore, a certain degree of voltage ripple is generated in the smoothing capacitor 4. For example, the voltage across the smoothing capacitor 4 becomes the voltage that pulsates in a range such that the voltage ripple has a maximum value smaller than twice its minimum value.

The voltage detector 11 is provided across the smoothing capacitor 4. The voltage detector 11 detects a capacitor voltage Vdc that is the voltage across the smoothing capacitor 4. A detection value of the capacitor voltage Vdc is input to the controller 12.

The inverter 3 is connected across the smoothing capacitor 4. The inverter 3: includes semiconductor switching elements Up, Un, Vp, Vn, Wp, and Wn connected in a three-phase bridge configuration; and forms a bridge circuit. A reflux diode is connected across and in antiparallel with each of the semiconductor switching elements. In the inverter 3, the semiconductor switching elements Up to Wn turn on or off under control of drive signals Gup to Gwn that are output from the controller 12. The inverter 3: turns on or turns off the semiconductor switching elements Up to Wn; and converts the direct-current voltage, smoothed by the smoothing capacitor 4, into the alternating-current voltage for supplying to the motor 110.

The semiconductor switching element 22c included in the converter 2 may be described as the "first semiconductor switching element" herein, and the semiconductor switching elements Up to Wn included in the inverter 3 may be described as the "second semiconductor switching elements" herein.

A current detector 7 detects a converter current Iconv that is a current flowing in the converter 2. The converter current Iconv is also the current flowing between the rectifier 20 and the booster 22. A current detector 8 detects an inverter current tiny that is a current flowing in the inverter 3. The inverter current tiny is also the current flowing between the inverter 3 and the smoothing capacitor 4. The converter current Iconv and the inverter current tiny are input to the controller 12.

The compressor 120 is the load that includes the motor 110. The load is, for example, included in an air conditioner. In the cases where the motor 110 serves as a motor that drives a compression mechanism, the motor 110 rotates according to the amplitude and the phase of the alternating-current voltage applied from the inverter 3, performing a compression operation.

The controller 12 includes a calculator 12a as a computing means. The calculator 12a is, for example, a microcomputer but may be another computing means referred to as a central processing unit (CPU), a microprocessor, a digital signal processor (DSP), or the like. The calculator 12a performs operation controls on the converter 2 and the inverter 3. The drive signals Gconv and Gup to Gwn that are output from the controller 12 are computed and generated by the single calculator 12a. In other words, control computations to control the operations of the converter 2 and the inverter 3 are performed by the single and common calculator 12a included in the controller 12.

The power converter 1 according to the first embodiment controls flow of an appropriate current into the motor 110 by having the semiconductor switching element 22c included in the booster 22 or the semiconductor switching elements Up to Wn included in the inverter 3 driven with appropriate timing. This control is performed on the basis of a detection value of the converter current Iconv that is detected by the current detector 7 and a detection value of the inverter current tiny that is detected by the current detector 8.

A typical power converter includes a converter control system that controls a bus voltage to a desired value. The bus voltage is a voltage between the direct-current bus lines to which the smoothing capacitor 4 is connected. This type of converter control system performs the control on the basis of the detection value detected by the current detector 7. Moreover, in the typical power converter, and in the power converter of sensorless control having no position sensor or no speed sensor includes an inverter control system that controls speed of the motor 110. According to this type of inverter control system, the control is performed based on the detection value detected by the current detector 8, because the control is performed for causing an estimated speed value estimated in the control system to match a speed command value. In other words, the power converter 1 according to the first embodiment uses the detection values obtained from the existing current detectors 7 and 8 in controlling the converter 2 or the inverter 3.

The converter current Iconv is an example of a physical quantity representing an operation state of the converter 2, and the inverter current Iinv is an example of a physical quantity representing an operation state of the inverter 3. In the present description, in order to distinguish these two physical quantities from each other, the physical quantity representing the operation state of the converter 2 may be described as the "first physical quantity", and the physical quantity representing the operation state of the inverter 3 may be described as the "second physical quantity". It is to be noted that other physical quantities may be used instead of the above described physical quantities. Another example of the first physical quantity is power that is exchanged between the converter 2 and the smoothing capacitor 4. Another example of the second physical quantity is power that is exchanged between the smoothing capacitor 4 and the inverter 3

A description is provided next of configurations and operations of essential parts of the power converter 1 according to the first embodiment. A current that flows through the smoothing capacitor is hereinafter denoted by "Ic".

First, when the semiconductor switching element 22c of the booster 22 does not conduct, a relation of the capacitor current Ic, the converter current Iconv, and the inverter current Iinv holds as expressed by Formula (1) below.

$$Ic = Iconv - Iinv \qquad (1)$$

In above Formula (1), the capacitor current Ic is defined as being of positive polarity in a direction of flow into a positive electrode of the smoothing capacitor 4, namely, in a charge current direction. The converter current Iconv is defined as being of positive polarity in a direction of current flow from the converter 2 into the smoothing capacitor 4. The inverter current Iinv is defined as being of positive polarity in a direction of current flow from the smoothing capacitor 4 into the inverter 3.

To extend a life of the smoothing capacitor 4, the capacitor current Ic should be reduced. This can be done by causing the converter current Iconv and the inverter current Iinv to equalize each other, as is obvious from above Formula (1). A description is hereinafter provided of a control technique that causes the converter current Iconv and the inverter current Iinv to equalize each other.

Figure 2:
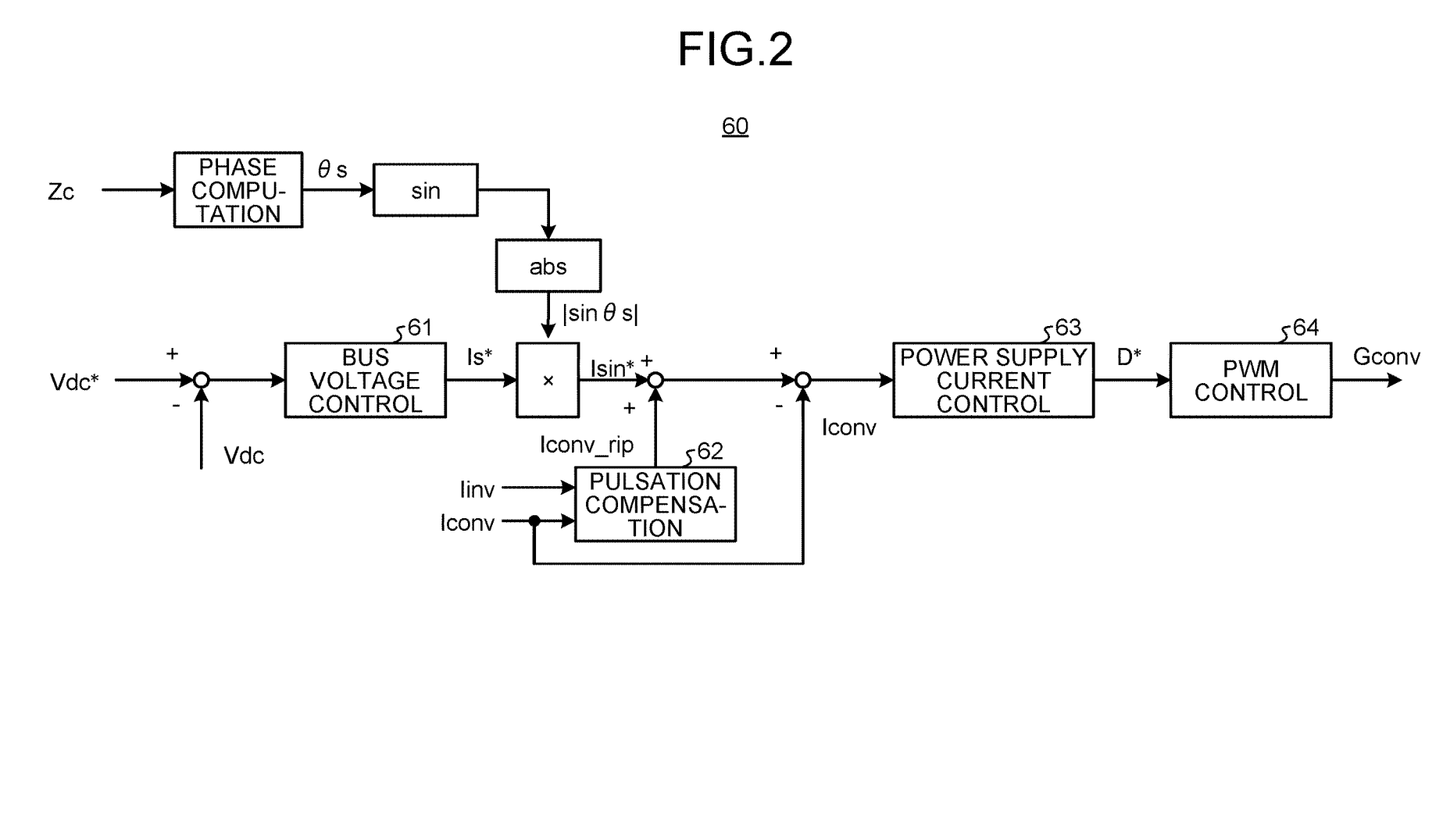
FIG. 2 is a diagram illustrating a configuration example of a converter current control system according to the first embodiment.

As mentioned above, in the first embodiment, the boost control is performed to boost the rectified voltage and improve the power factor of the power supply current. At this time, in the converter 2, the converter current Iconv, the bus voltage, a phase of the power supply voltage Vs, and another factor determine timing of the turning on and off of the semiconductor switching element 22c. Therefore, a control system illustrated FIG. 2 is conceivable. In other words, FIG. 2 is a diagram illustrating a configuration example of the converter current control system 60 according to the first embodiment.

A description is provided of the operation of the converter current control system 60 illustrated in FIG. 2. In the following description, "Vdc" is described as the bus voltage. In the configuration of FIG. 1, the bus voltage is equal to the capacitor voltage Vdc.

As illustrated in FIG. 2, the converter current control system 60 is configured as a control system that has bus voltage control as a major loop and power supply current control as a minor loop.

In a bus voltage control block 61, a current command value Is* is generated on the basis of a difference between a bus voltage command value Vdc* and the bus voltage Vdc. The bus voltage control block 61 can be configured using, for example, a proportional-integral (PI) controller. A power supply current command value Isin* is generated by multiplying the current command value Is* by an absolute value |sin θs| of a sinusoidal signal sin θs.

θs denotes the phase of the power supply voltage Vs. The phase θs can be determined by phase computation based on the zero crossing signal Zc obtained from the zero crossing detector 10. The phase computation can use a phase lock loop (PLL) process.

Figure 3:
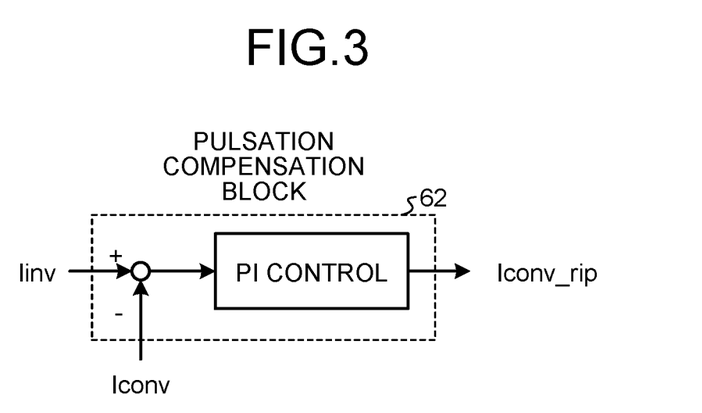
FIG. 3 is a diagram illustrating a first configuration example of a pulsation compensation block in the converter current control system according to the first embodiment.
Figure 4:
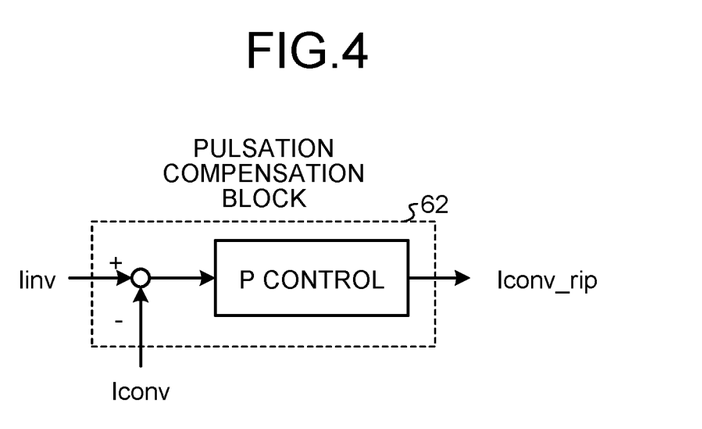
FIG. 4 is a diagram illustrating a second configuration example of the pulsation compensation block in the converter current control system according to the first embodiment.

Attention is focused on a pulsation compensation block 62 illustrated in FIG. 2 here. In the pulsation compensation block 62, a compensating amount Iconv_rip of converter current Iconv is computed such that the converter current Iconv equals the inverter current Iinv. FIGS. 3 and 4 illustrate configuration examples of the pulsation compensation block 62. FIG. 3 is a diagram illustrating a first one of the configuration examples of the pulsation compensation block 62 in the converter current control system 60 according to the first embodiment. FIG. 4 is a diagram illustrating a second one of the configuration examples of the pulsation compensation block 62 in the converter current control system 60 according to the first embodiment.

FIG. 3 illustrates a configuration example in which a PI controller is used to control the converter current Iconv as a control target with the inverter current Iinv as a value to be achieved. In the configuration example of FIG. 4, a P controller is used to control the converter current Iconv as the control target with the inverter current Iinv as a value to be achieved. Of course, these controllers are only examples that cause the converter current Iconv to equalize into the inverter current Iinv and are not limiting examples.

Returning to FIG. 2, the compensating amount Iconv_rip of the converter current Iconv is added to the power supply current command value Isin*, and this sum minus the converter current Iconv is input to a power supply current control block 63. The power supply current control block 63 can be configured with a PI controller, too. In the power supply current control block 63, a duty command D* is generated and is input to a PWM control block 64. In the PWM control block 64, the drive signal Gconv is generated.

As described above, in the converter current control system 60 illustrated in FIG. 2, the compensating amount Iconv_rip of converter current Iconv is computed such that the converter current Iconv equals the inverter current Iinv. The semiconductor switching element 22c then turns on or turns off under the control of the pulse-width modulation (PWM) signal so that a desired converter current Iconv is realized taking the compensating amount Iconv_rip into consideration.

Figure 5:
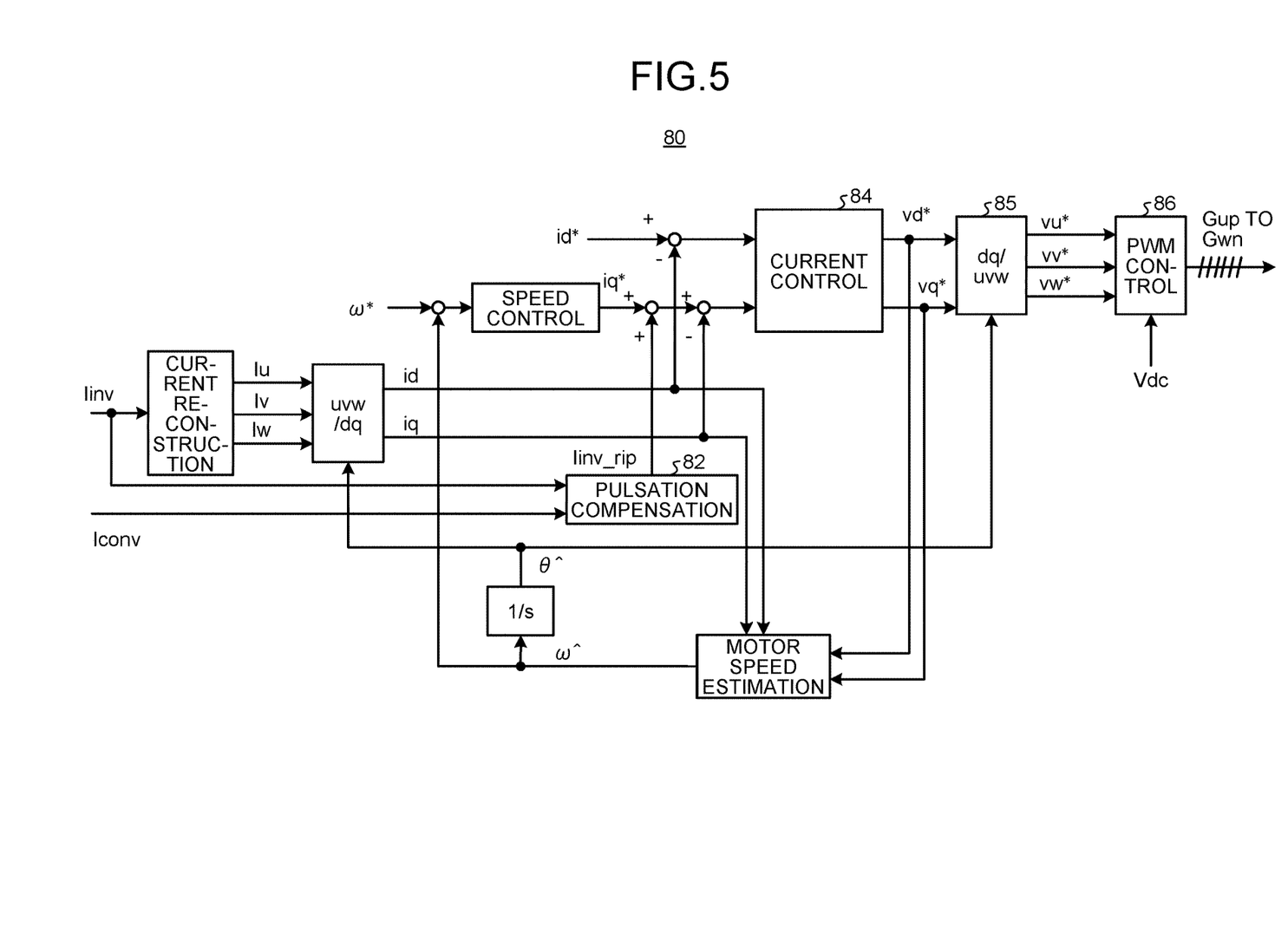
FIG. 5 is a diagram illustrating a configuration example of an inverter current control system according to the first embodiment.

The preceding description has been for the control system in which the converter current Iconv is the control target. A description is provided next of the configuration and the operation of a control system in which the inverter current Iinv is a control target. FIG. is a diagram illustrating a configuration example of the inverter current control system 80 according to the first embodiment.

In the inverter current control system 80, as illustrated in FIG. 5, a d-axis and a q-axis current id and iq in a rotating reference frame are computed in order for three phase voltage command values vu*, vv*, and vw* to be generated. The three phase voltage command values vu*, vv*, and vw* refer to command values that are used in voltage application to the motor for rotating the motor 110 at a desired rotational speed. The drive signals Gup to Gwn for the semiconductor switching elements Up to Wn are generated by PWM control for desired d-axis and q-axis currents id and iq to be realized.

Explanations of characters used in FIG. 5 are added here. "Iu, Iv, and Iw" denote current values in a stationary three-phase reference frame. "uvw/dq" denotes a process of converting values in the stationary three-phase reference frame to values in the d-q rotating reference frame; and "dq/uvw" denotes a process of converting values in the d-q rotating reference frame to values in the stationary three-phase reference frame. "id*, iq*, vd*, and vq*" respectively denote a d-axis current command value, a q-axis current command value, a d-axis voltage command value, and a q-axis voltage command value in the d-q rotating reference frame. "ω*, ω^, and θ^" respectively denote a rotational speed command value, an estimated rotational speed value, and an estimated rotor position of the motor 110.

Figure 6:
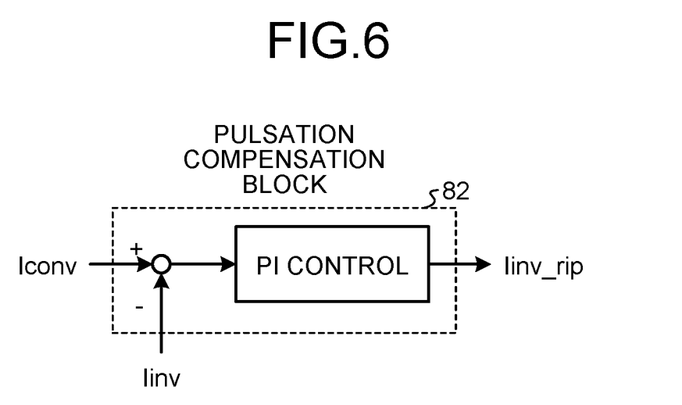
FIG. 6 is a diagram illustrating a first configuration example of a pulsation compensation block in the inverter current control system according to the first embodiment.
Figure 7:
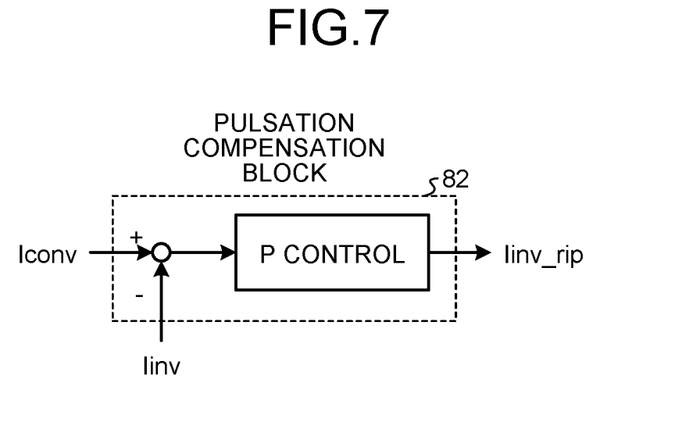
FIG. 7 is a diagram illustrating a second configuration example of the pulsation compensation block in the inverter current control system according to the first embodiment.

Attention is focused on a pulsation compensation block 82 illustrated in FIG. 5 here. In the pulsation compensation block 82, a compensating amount Iinv rip of inverter current Iinv is computed such that the inverter current Iinv equals the converter current Iconv. FIGS. 6 and 7 illustrate configuration examples of the pulsation compensation block 82. FIG. 6 is a diagram illustrating a first configuration example of the pulsation compensation block 82 in the inverter current control system 80 according to the first embodiment. FIG. 7 is a diagram illustrating a second configuration example of the pulsation compensation block 82 in the inverter current control system 80 according to the first embodiment.

In the configuration example of FIG. 6, a PI controller is used to control the inverter current Iinv as the control target with the converter current Iconv as a value to be achieved. In the configuration example of FIG. 7, a P controller is used to control the inverter current Iinv as the control target with the converter current Iconv as the value to be achieved. Of course, these controllers are only examples that cause the inverter current Iinv to equalize into the converter current Iconv and are not limiting examples.

Returning to FIG. 5, the compensating amount Iinv rip of inverter current Iinv is added to the q-axis current command value Iq*, and this sum minus the q-axis current iq is input to a current control block 84. The current control block 84 can be configured with a PI controller, too. The d-axis voltage command value vd* and the q-axis voltage command value vq* are generated in the current control block 84 and converted in a coordinate transformation block 85 to the three phase voltage command values vu*, vv*, and vw* to be input to a PWM control block 86. In the PWM control block 86, the drive signals Gup to Gwn are generated on the basis of the capacitor voltage Vdc.

As described above, in the inverter current control system 80 illustrated in FIG. 5, the compensating amount Iinv rip of inverter current Iinv is computed such that the inverter current Iinv equals the converter current Iconv. The semiconductor switching elements Up to Wn then turn on or turn off under the control of the PWM signals so that a desired inverter current Iinv is realized taking the compensating amount Iinv rip into consideration.

Figure 8:
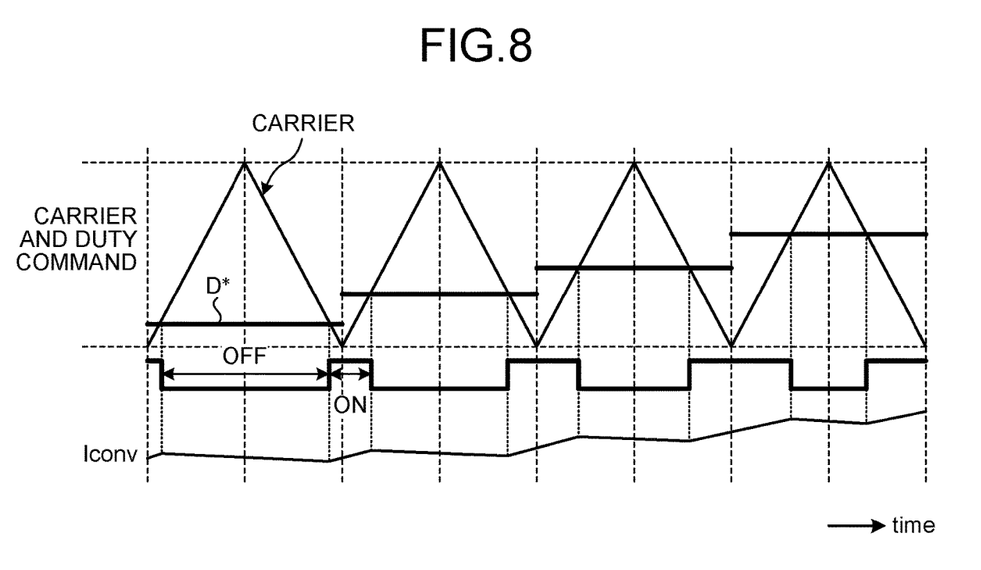
FIG. 8 is a diagram illustrating an example of operating waveforms in the converter of FIG. 1 that is controlled by the converter current control system of FIG. 2.

FIG. 8 is a diagram illustrating an example of operating waveforms in the converter 2 of FIG. 1 that is controlled by the converter current control system 60 of FIG. 2. A horizontal axis of FIG. 8 represents time, and one division of the horizontal axis is of the order of several milliseconds. A vertical axis represents amplitude of each of the waveforms. Specifically, a top section illustrates a carrier, and the duty command D*; a middle section illustrates the drive signal Gconv; and a bottom section illustrates the converter current Iconv.

In the waveform example of FIG. 8, the semiconductor switching element 22c is: on when the amplitude of the duty command D* is higher than the amplitude of the carrier; and off when the amplitude of the duty command D* is lower than the amplitude of the carrier. When the semiconductor switching element 22c is on, the converter current Iconv increases. When the semiconductor switching element 22c is off, the converter current Iconv decreases. Therefore, the waveform of the converter current Iconv includes a ripple.

Figure 9:
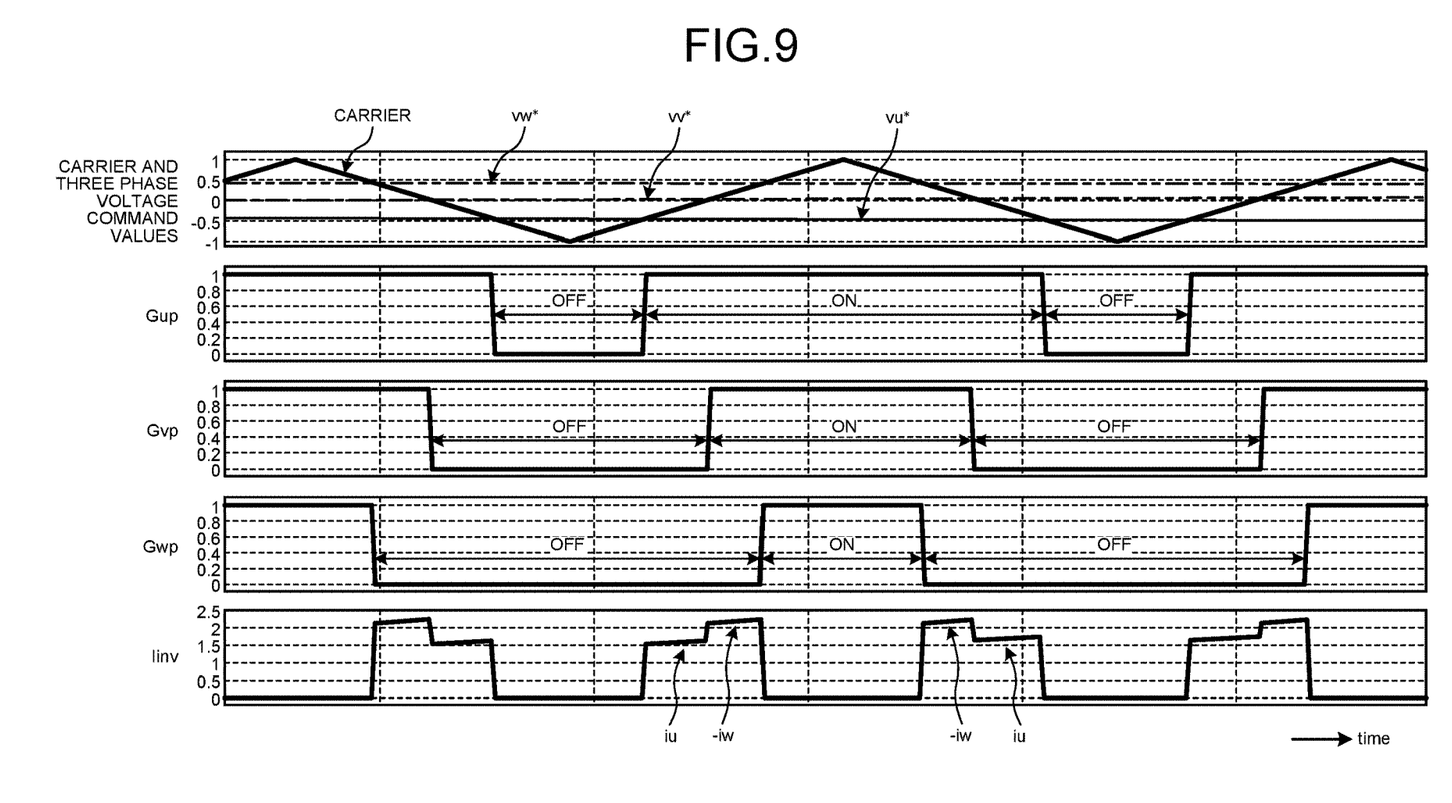
FIG. 9 is a diagram illustrating an example of operating waveforms in the inverter of FIG. 1 that is controlled by the inverter current control system of FIG. 5.

FIG. 9 is a diagram illustrating an example of operating waveforms in the inverter 3 of FIG. 1 that is controlled by the inverter current control system 80 of FIG. 5. A horizontal axis of FIG. 9 represents time, and one division of the horizontal axis is of the order of several tens of microseconds. A vertical axis represents amplitude of each of the waveforms. Specifically, a top section illustrates a carrier in a thick solid line, the U-phase voltage command value in a solid line, the V-phase voltage command value in a dot-and-dash line, and the W-phase voltage command value in a two-dot chain line. An upper middle section illustrates the U-phase drive signal Gup, a middle section illustrates the V-phase drive signal Gyp, and a lower middle section illustrates the W-phase drive signal Gwp. A bottom section illustrates the inverter current Iinv.

In FIG. 9, a portion marked by "iu" denotes that a U-phase current iu is detected flowing as the inverter current Iinv in a U phase of the motor 110. A portion marked by "-iw" denotes that a W-phase current iw is detected flowing as the inverter current Iinv in a W phase of the motor 110 and is of polarity opposite to that of the U-phase current iu. As illustrated in this example, the inverter current Iinv as the detectable motor current phase varies in accordance with driven states of the semiconductor switching elements Up to Wn. For this reason, timing of the detection of the inverter current Iinv needs to be set in accordance with the switched states of the inverter 3.

Therefore, in the cases where, as described above, the respective detection values of the inverter current Iinv and the converter current Iconv are used in the reduction of the capacitor current Ic of the smoothing capacitor 4, respective timings of detection value samplings need to coincide. On the other hand, as indicated in FIG. 9, there is a constraint on the detection of the inverter current Iinv. Therefore, the sampling timing for obtaining the detection value of the converter current Iconv needs to be set in accordance with the constraint on the timing for obtaining the detection value of the inverter current Iinv.

For example, consider a case where a calculator that controls the converter 2 and a calculator that controls the inverter 3 are different from each other here. In this case, the calculator that controls the converter 2 cannot ascertain the timing of the driving of the semiconductor switching elements Up to Wn in the inverter 3. Moreover, as indicated in FIGS. 8 and 9, the converter 2 and the inverter 3 have very different control intervals from each other. Therefore, causing the sampling timings of the calculator that controls the converter 2 and of the calculator that controls the inverter 3 to coincide is difficult.

Exchange of information between the calculators is also conceivable. However, a difference between operational clocks, a difference between processor capabilities, a difference between thermal behaviors of the calculators, and others need to be considered, contributing to a complicated circuit configuration. In addition, for some detectors, required connection wiring among the calculators and the detectors is complicated, leading to increased costs.

In contrast, implementing the control of the converter 2 and the control of the inverter 3 with the single calculator rather than the different computing units, as described herein, solves the above problems. Moreover, the implementation by the single calculator enables the single calculator to readily ascertain the timing of driving the semiconductor switching elements Up to Wn of the inverter 3 when controlling the converter 2. Therefore, the acquisition of the converter current Iconv and the inverter current Iinv with appropriate timing is enabled, enabling the control that reduces the capacitor current Ic to be more accurate.

While the compressor has been described above as the example of the load, this is not limiting. The control technique described above is applicable to rotation control of a motor that drives a mechanism with period torque pulsations, including the compressor.

Figure 10:
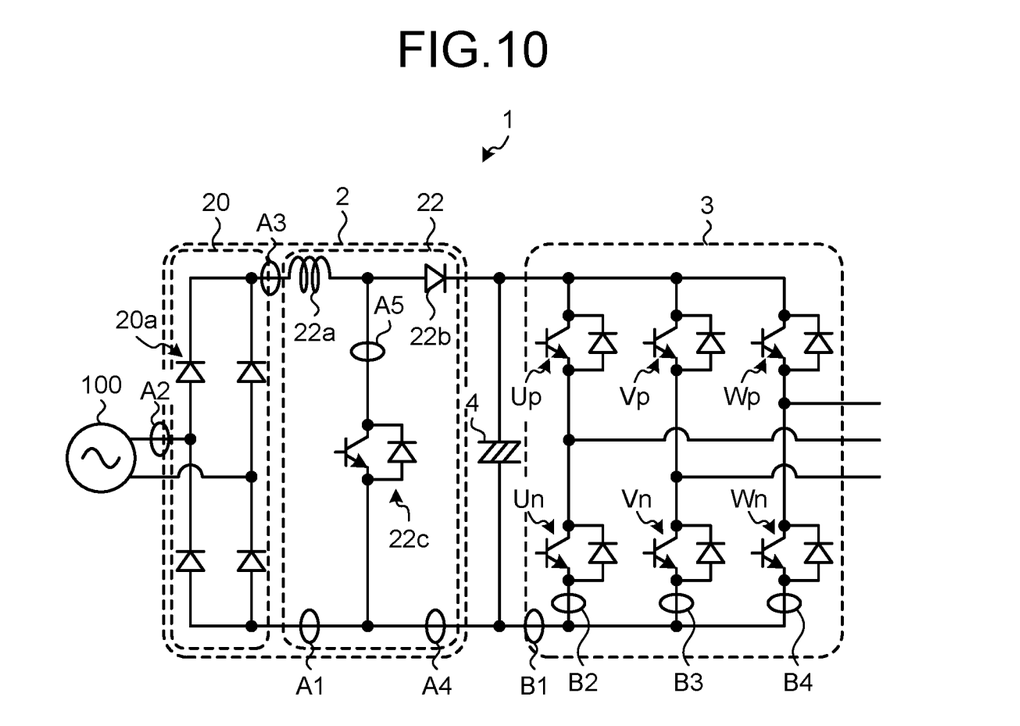
FIG. 10 is a diagram that is used for describing variations in arrangement of current detectors according to the first embodiment.

In the example of FIG. 1: the current detector 7, which detects the converter current Iconv, is disposed between the rectifier 20 and the booster 22 on the low potential-side direct-current bus line; and the current detector 8, which detects the inverter current Iinv, is disposed between the smoothing capacitor 4 and the inverter 3 on the low potential-side direct-current bus line. However, this is not limiting. FIG. 10 is a diagram that is used for describing variations in the arrangement of the current detectors 7 and 8 according to the first embodiment. While position A1 of the circuit diagram illustrated in FIG. 10 is where the current detector 7 is disposed in the example of FIG. 1, the current detector 7 may be disposed at any of positions A2 to A4 instead. While position B1 of the circuit diagram illustrated in FIG. 10 is where the current detector 8 is disposed in the example of FIG. 1, the current detector 8 may be disposed at least at any two of positions B2 to B4 instead.

At position A5, however, the current flows through a detector only when the semiconductor switching element 22c is turned on. For this reason, the timing of current detection and the timing of the turning on or turning off of the semiconductor switching element 22c need to be synchronized. Therefore, the calculator 12a according to the first embodiment needs to detect the converter current Iconv and the inverter current Iinv in accordance with timing of conduction or nonconduction of the semiconductor switching element 22c in the converter 2.

Figure 11:
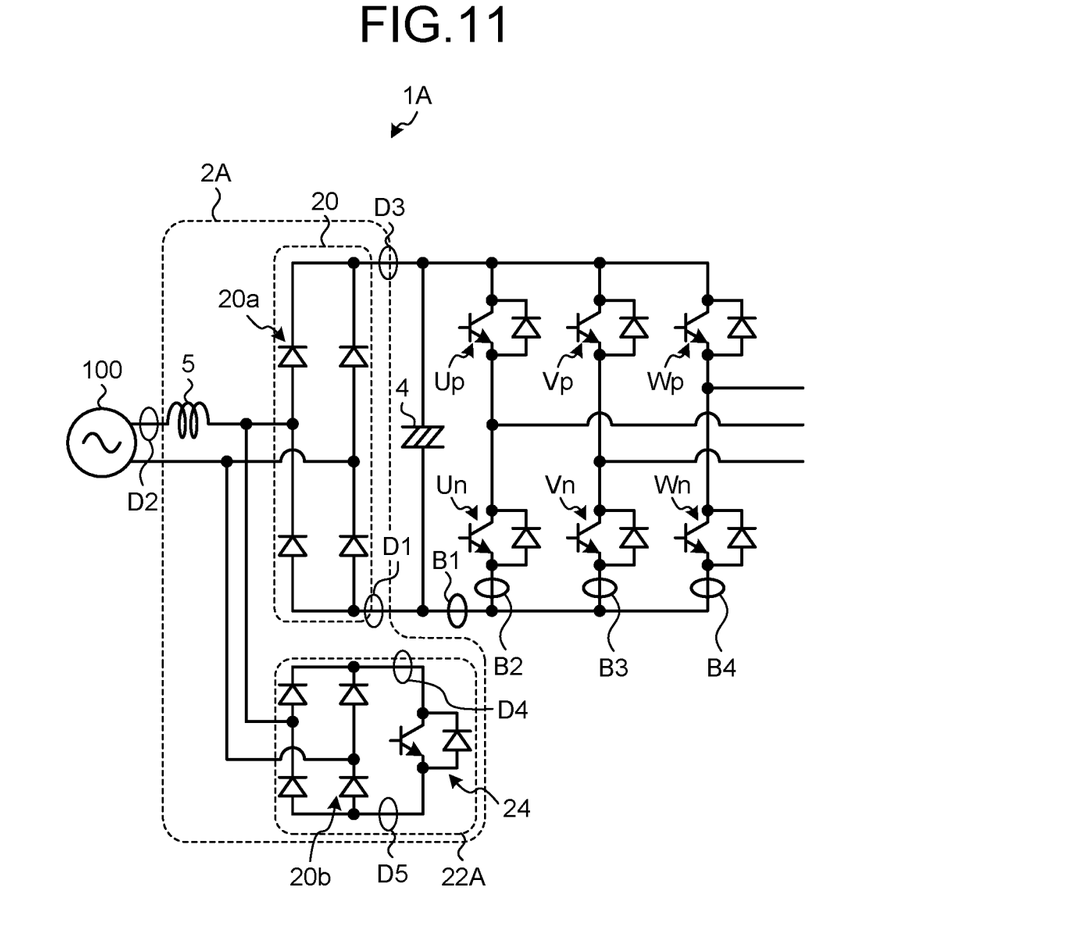
FIG. 11 is a diagram illustrating a configuration example of a power converter according to a modification of the first embodiment.

The power converter 1 illustrated in FIG. 1 may be modified into what is illustrated in FIG. 11. FIG. 11 is a diagram illustrating a configuration example of the power converter 1A according to the modification of the first embodiment.

The power converter 1A illustrated in FIG. 11 includes a converter 2A in place of the converter 2. The converter 2A includes, in place of the booster 22, a booster 22A and a reactor 5. The reactor 5 is disposed between the alternating-current power supply 100 and the rectifier 20. As with the converter 2 illustrated in FIG. 1, the converter 2A is a constituent element having a rectification function and a boost function in combination. The booster 22A includes four rectifier elements 20b and a semiconductor switching element 24. The booster 22A is connected in parallel with the rectifier 20. The configuration is otherwise identical or equivalent to that of the power converter 1 illustrated in FIG. 1, and identical or equivalent constituent elements have the same reference characters.

In FIG. 11, if a detector for the converter current Iconv is provided at any of positions D1 to D5, the detection of the converter current Iconv is possible. If a detector for the inverter current Iinv is provided at position B1 or at least at two of positions B2 to B4, the detection of the inverter current Iinv is possible.

However, at position D4 or D5, the current flows through the detector only when the semiconductor switching element 24 is turned on. For this reason, timing of current detection and timing of turning on or off of the semiconductor switching element 24 need to be synchronized. Therefore, the calculator 12a according to the first embodiment needs to detect the converter current Iconv and the inverter current Iinv in accordance with timing of conduction or nonconduction of the semiconductor switching element 24 included in the converter 2A.

In the typical power converter, detectors are disposed at positions appropriate to a use. The use of the technique according to the first embodiment enables the acquisition of the converter current Iconv and the inverter current Iinv with the appropriate timing, regardless of the positions where the detectors are disposed. Therefore, additional costs for a circuit are suppressed.

As described above, in the power converter according to the first embodiment, the controller includes the single calculator performing the control such that the first physical quantity representing the operation state of the converter is equal to the second physical quantity representing the operation state of the inverter. The single calculator can ascertain the timing of driving the semiconductor switching elements of the inverter when controlling the converter. Therefore, the acquisition of the detection value of the converter current and the detection value of the inverter current with the appropriate timing is enabled, enabling the capacitor current to be reduced with increased accuracy. Thus, the power converter according to the first embodiment, if used, avoids degradation of the control accuracy while enabling reduced capacitance of the smoothing capacitor.

The control technique according to the first embodiment is the technique that controls the first physical quantity, which corresponds to the converter current, and the second physical quantity, which corresponds to the inverter current, rather than using, as in Patent Literature 1, the capacitor current as a value to be achieved. Moreover, for the present control technique, the value to be achieved is not a fixed value but constantly changes, and as illustrated in FIGS. 4 and 7, integral control is not requisite. Therefore, compared with the control configuration of Patent Literature 1 that requires the integral control, the control configuration is simple, with the degradation of the control accuracy and control failure, too, being less likely. Thus, occurrences of the degradation of the control accuracy and the control failure are avoidable. In addition, the present control technique can ideally reduce the capacitor current to zero, thus enabling the smoothing capacitor to have an extended life.

Second Embodiment

Figure 12:
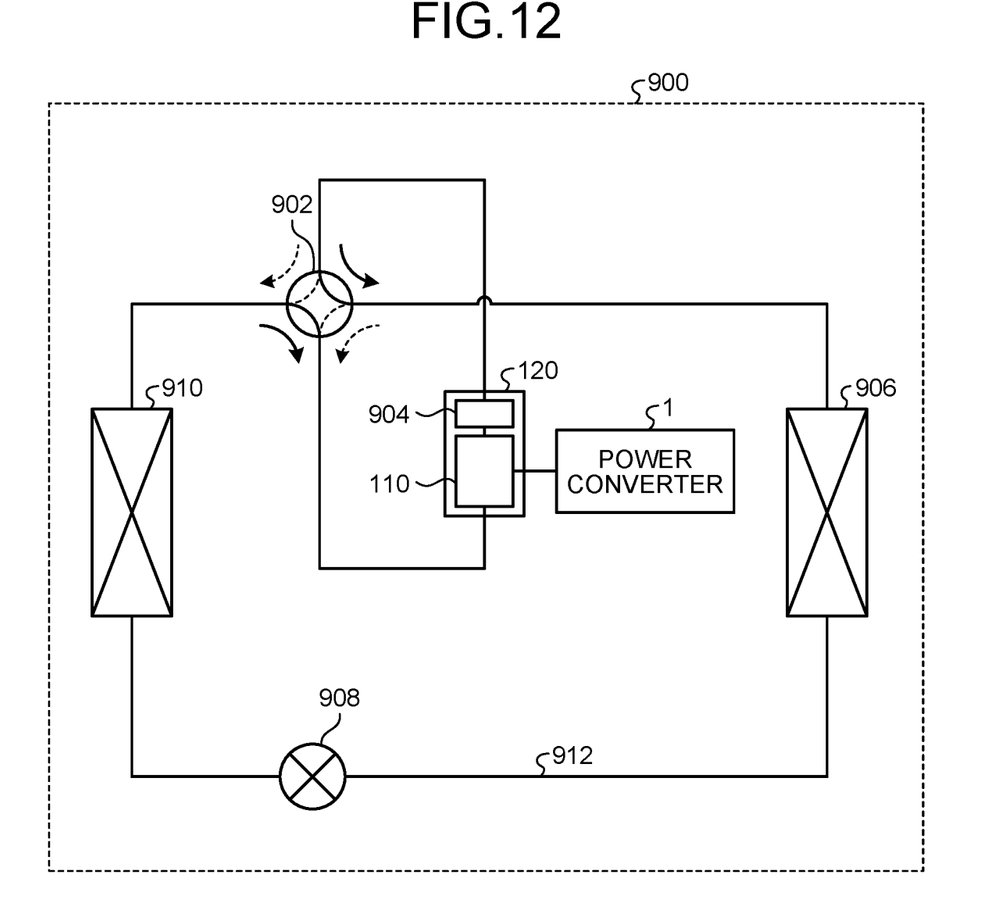
FIG. 12 is a diagram illustrating a configuration example of a refrigeration cycle applied equipment according to a second embodiment.

FIG. 12 is a diagram illustrating a configuration example of a refrigeration cycle applied equipment 900 according to a second embodiment. The refrigeration cycle applied equipment 900 according to the second embodiment includes the power converter 1 described in the first embodiment. The refrigeration cycle applied equipment 900 according to the second embodiment is applicable to a product with a refrigeration cycle, such as an air conditioner, a refrigerator, a freezer, or a heat pump water heater. In FIG. 12, constituent elements with the same functions as those in the first embodiment have the same reference characters as in the first embodiment.

The refrigeration cycle applied equipment 900 has a compressor 120 with a built-in motor 110 of the first embodiment, a four-way valve 902, an indoor heat exchanger 906, an expansion valve 908, and an outdoor heat exchanger 910 connected via refrigerant piping 912.

The compressor 120 internally includes a compression mechanism 904 that compresses a refrigerant and the motor 110 that runs the compression mechanism 904.

The refrigeration cycle applied equipment 900 is capable of operating for heating or cooling through switching operation of the four-way valve 902. The compression mechanism 904 is driven by the motor 110 that is controlled at variable speed.

In the heating operation, as indicated by solid line arrows, the refrigerant is pressurized and discharged by the compression mechanism 904 and returns to the compression mechanism 904 through the four-way valve 902, the indoor heat exchanger 906, the expansion valve 908, the outdoor heat exchanger 910, and the four-way valve 902.

In the cooling operation, as indicated by dashed line arrows, the refrigerant is pressurized and discharged by the compression mechanism 904 and returns to the compression mechanism 904 through the four-way valve 902, the outdoor heat exchanger 910, the expansion valve 908, the indoor heat exchanger 906, and the four-way valve 902.

In the heating operation, the indoor heat exchanger 906 acts as a condenser to release heat, and the outdoor heat exchanger 910 acts as an evaporator to absorb heat. In the cooling operation, the outdoor heat exchanger 910 acts as a condenser to release heat, and the indoor heat exchanger 906 acts as an evaporator to absorb heat. The expansion valve 908 depressurizes and expands the refrigerant.

The described refrigeration cycle applied equipment 900 according to the second embodiment includes the power converter 1 described in the first embodiment; however, this is not limiting. The power converter 1A illustrated in FIG. 11 may be included instead. In addition, a power converter other than the power converters 1 and 1A may be used, provided that the control technique according to the first embodiment is applicable.

The above configurations illustrated in the embodiments are illustrative, can be combined with other techniques that are publicly known, and can be partly omitted or changed without departing from the gist.

The invention claimed is:
1. A power converter comprising:
a converter including at least one first semiconductor switching element and is adapted to rectify a power supply voltage applied from an alternating-current power supply;
a smoothing capacitor adapted to smooth a rectified voltage output from the converter into a direct-current voltage containing a ripple;
an inverter adapted to convert the direct-current voltage smoothed by the smoothing capacitor into an alternating-current voltage to be supplied to a motor; and a single calculator adapted to perform a control such that
  a first physical quantity is equal to a second physical
  quantity, wherein
  the first physical quantity represents an operation state
    of the converter and the second physical quantity
    represents an operation state of the inverter, wherein
  the single calculator is adapted to set a sampling timing
    for obtaining detection value of the first physical quantity in accordance with a constraint on sampling timing
    for obtaining detection value of the second physical
    quantity.

2. The power converter according to claim 1, wherein
the single calculator is adapted to detect the first physical
  quantity and the second physical quantity in accordance
  with timing of conduction or nonconduction of the at
  least one first semiconductor switching element.

3. The power converter according to claim 1, wherein
the single calculator is adapted to control the converter
  such that the first physical quantity is equal to the
  second physical quantity.

4. A motor driver comprising the power converter according to claim 1.

5. A refrigeration cycle applied equipment comprising the power converter according to claim 1.

6. A power converter according to comprising:
a converter including at least one first semiconductor
  switching element and is adapted to rectify a power
  supply voltage applied from an alternating-current
  power supply;
a smoothing capacitor adapted to smooth a rectified
  voltage output from the converter into a direct-current voltage containing a ripple;
an inverter adapted to convert the direct-current voltage
  smoothed by the smoothing capacitor into an alternating-current voltage to be supplied to a motor; and
a single calculator adapted to perform a control such
  that a first physical quantity is equal to a second
  physical quantity, wherein
  the first physical quantity represents an operation
    state of the converter and the second physical
    quantity represents an operation state of the
    inverter wherein
  the single calculator is adapted to control the inverter such
    that the second physical quantity is equal to the first
    physical quantity.

7. The power converter according to claim 6, wherein
the single calculator is adapted to control the converter
  such that the first physical quantity is equal to the
  second physical quantity.

8. A motor driver comprising the power converter according to claim 6.

9. A refrigeration cycle applied equipment comprising the power converter according to claim 6.

* * * * *